Aug. 19, 1952 H. WEBER 2,607,239
REMOTE-CONTROL DEVICE FOR BRAKES AND THE LIKE
Filed Oct. 26, 1950
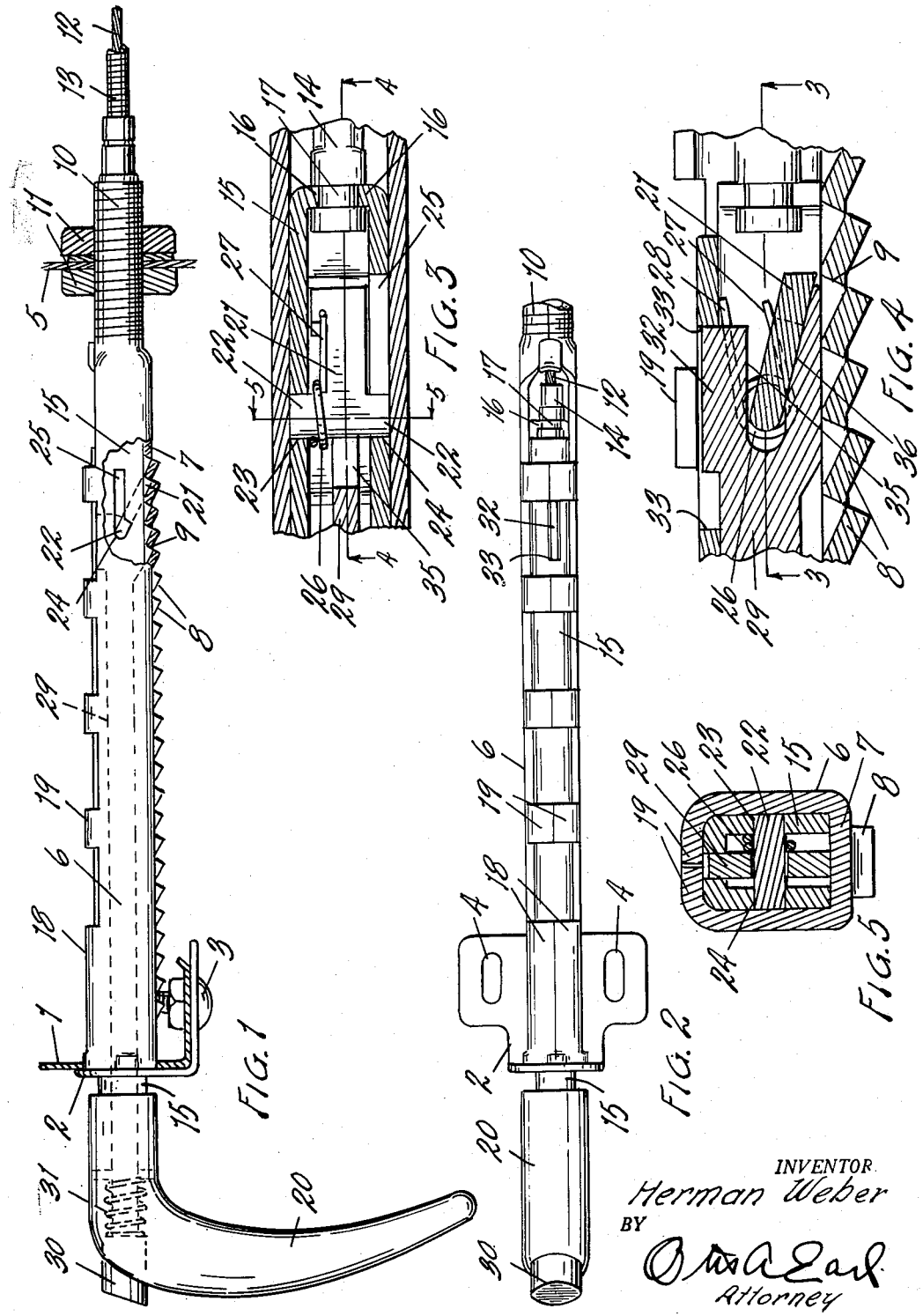
INVENTOR
Herman Weber
BY
Attorney

UNITED STATES PATENT OFFICE 2,607,239

REMOTE-CONTROL DEVICE FOR BRAKES AND THE LIKE

Herman Weber, Kalamazoo, Mich., assignor to Shakespeare Products Company, Kalamazoo, Mich.

Application October 26, 1950, Serial No. 192,282

4 Claims. (Cl. 74—537)

This invention relates to improvements in a remote control device for brakes and the like.

The main objects of this invention are:

First, to provide a control device which is well adapted for the controlling of brakes and the like and one which is simple and economical in structure and one in which the parts are effectively supported in their coacting relation to receive the strains to which they are subjected in use.

Second, to provide a control device in which the parts are easily fabricated and assembled.

Third, to provide a control device which is easily manipulated to the desired holding position and easily released.

Further objects relating to details and economies of the invention will appear from the description to follow. The invention is defined and pointed out in the claims.

A preferred embodiment of the invention is illustrated in the accompanying drawing, in which:

Fig. 1 is a fragmentary side elevational view of a control device embodying my invention, parts being shown in section.

Fig. 2 is a fragmentary plan view.

Fig. 3 is an enlarged fragmentary view in longitudinal section on a line corresponding to line 3—3 of Fig. 4.

Fig. 4 is a fragmentary view partially in longitudinal section on a line corresponding to line 4—4 of Fig. 3.

Fig. 5 is a transverse section on a line corresponding to line 5—5 of Fig. 3.

In the embodiment of my invention illustrated in the accompanying drawing 1 represents part of a motor vehicle or other support to which the mounting bracket 2 of the assembly is attached by means of bolts 3 engaging slots 4. A support 5 for the rear end of the assembly is conventionally shown. The support member 6 to the front end of which the bracket 2 is secured is of upwardly facing channel section and its web 7 is conformed to provide a series of forwardly facing ratchet teeth 8. These teeth are desirably formed by transversely slitting the web at 9 and deflecting or striking out portions between the slits as best shown in Fig. 4 to provide the teeth 8. The support member has a tubular portion 10 at its rear end which is externally threaded to receive the nuts 11 by means of which the support member is secured to the part 5.

The transmission element 12 is provided with a flexible sheath 13 secured to the end of the support member. The details of this are not illustrated as they form no part of this invention. The transmission element 12 is provided with a coupling member 14 at its front end which is connected to the rear end of the adjusting member 15 by the inturned lugs or parts 16 engaging the groove 17 in the coupling member. The adjusting member 15 is of downwardly facing channel section and is reciprocatingly supported within the support member 6.

For convenience in manufacturing and securing the parts in assembled relation, the support member 6 is provided with inturned parts 18 and 19 which are conformed to overhang the adjusting member as shown in the drawing and to retain it in its assembled reciprocating relation in the support member. The adjusting member 15 is provided with a grip or handle 20 at its front end.

The holding pawl or detent 21, desirably formed as a single piece stamping, is provided with a pivot portion 22 disposed in the opposed pivot openings 23 and 24 in the sides of the adjusting member. The pivot opening opens into a slot 25 to facilitate the assembling of the pawl. The torsional spring 26 is arranged around the pivot and terminates at one end in the arm 27 engaging the pawl and at the other end of the arm 28 engaging the adjusting member, thus biasing the pawl to engaging position. The pawl release member 29 is slidably mounted in the adjusting member and is provided with a finger piece 30 at its front end positioned to be engaged by the thumb of the hand grasping the grip or handle 20. The coil spring 31 urges the release member to its retracted position. The movement of the release member is limited by the stop 32 coacting with stops 33—33 on the adjusting member, as is best shown in Fig. 4. The rear end of the release member is provided with a longitudinal slot 35 receiving the pawl and has a rearwardly inclined cam portion 36 below the slot adapted to slidably engage the pawl 21 to lift it from engagement with the ratchet teeth.

When the pawl release member is in actuated position as shown in Fig. 4, the adjusting member may be adjusted backward and forward; however, the normal operation is to allow the pawl to ratchet over the ratchet teeth on the support when the adjusting member is pulled forwardly so that the pawl ratchets over the teeth and engages a tooth in its adjusted position. When it is desired to release the adjusting member, a push on the finger piece 30 releases or disengages the pawl so that the adjusting member may move freely rearwardly. In setting a brake, for example, it is only necessary to pull forwardly on the grip 20.

I have illustrated and described my invention in a highly practical commercial embodiment. I have not attempted to illustrate or describe other embodiments or adaptations which I contemplate as it is believed that this disclosure will enable those skilled in the art to embody or adapt my invention as may be desired.

Having thus described my invention, what I claim as new and desire to secure by Letters Patent is:

1. In a control device the combination of an elongated sheet metal support member of upwardly facing channel section, the web of which is conformed to provide a plurality of forwardly facing ratchet teeth, an elongated sheet metal adjusting member of downwardly facing channel section slidable within said support member with the bottoms of its flanges supported on the web of the support member and provided with a grip at its front end, ears spaced along the flanges of said support member and folded over in lapped retaining engagement with said adjusting member, a flat pawl disposed between the sides of said adjusting member and having integral laterally projecting ears on its upper end pivotally received in the flanges of said adjusting member, the flanges of said adjusting member having pivot holes therein receiving said ears on said pawl, one of said holes having a slot opening therefrom permitting assembly of said pawl therethrough, a torsional spring arranged on the pivot of said pawl and provided with arms at its ends, one engaging the pawl and the other said adjusting member, a flat sheet metal release member longitudinally reciprocable in said adjusting member and longitudinally slotted at its rear end to receive said pawl and permit its movement relative to the pawl, said release member being retainingly engaged at its upper and lower edges between the webs of said supporting member and said adjusting member and being provided with a pawl engaging cam portion on the lower side of its slot engageable with said pawl for lifting it to inoperative position when the release member is moved rearwardly, the release member being provided with an integral stop on its upper edge received in a slot in the web of said adjusting member to form coacting stops limiting the movement of said release member relative to said adjusting member, and a return spring for said release member, said release member having a finger piece associated with the grip for simultaneous actuation, the rear end of said support member being formed into circular cross section and externally threaded for clamping engagement through a support panel by nuts threaded on the support member on each side of the panel.

2. In a control device the combination of an elongated sheet metal support member of upwardly facing channel section, the web of which is conformed to provide a plurality of forwardly facing ratchet teeth, an elongated sheet metal adjusting member of downwardly facing channel section slidable within said support member with the bottoms of its flanges supported on the web of the support member and provided with a grip at its front end, ears spaced along the flanges of said support member and folded over in lapped retaining engagement with said adjusting member, a flat spring biased pawl disposed between the sides of said adjusting member and having integral laterally projecting ears on its upper end pivotally received in the flanges of said adjusting member, the flanges of said adjusting member having pivot holes therein receiving said ears on said pawl, one of said holes having a slot opening therefrom permitting assembly of said pawl therethrough, a flat sheet metal release member longitudinally reciprocable in said adjusting member and longitudinally slotted at its rear end to receive said pawl and permit its movement relative to the pawl, said release member being retainingly engaged at its upper and lower edges between the webs of said supporting member and said adjusting member and being provided with a pawl engaging cam portion on the lower side of its slot engageable with said pawl for lifting it to inoperative position when the release member is moved rearwardly, the release member being provided with an integral stop on its upper edge received in a slot in the web of said adjusting member to form coacting stops limiting the movement of said release member relative to said adjusting member, and a return spring for said release member, said release member having a finger piece associated with the grip for simultaneous actuation, the rear end of said support member being formed into circular cross section and externally threaded for clamping engagement through a support panel by nuts threaded on the support member on each side of the panel.

3. In a control device the combination of an elongated support member of upwardly facing channel section, the web of which is conformed to provide a plurality of forwardly facing ratchet teeth, an elongated sheet metal adjusting member of downwardly facing channel section slidable within said support member with at least one flange of the adjusting member supported on the web of the support member and provided with a grip at its front end, ears spaced along one flange of said support member and folded over in lapped retaining engagement with said adjusting member, a flat pawl disposed between the sides of said adjusting member and having integral laterally projecting ears on its upper end pivotally received in the flanges of said adjusting member, the flanges of said adjusting member having pivot holes therein receiving said ears on said pawl, one of said holes having a slot opening therefrom permitting assembly of said pawl therethrough, a torsional spring arranged on the pivot of said pawl and provided with arms at its ends, one engaging the pawl and the other said adjusting member, an elongated flat release member arranged on edge in said adjusting member and reciprocable therein, said release member being slotted at its rear end and provided with a pawl engaging portion on the lower side of its slot for lifting the pawl to inoperative position when the release member is moved rearwardly, the release member and adjusting member being provided with coacting stops limiting the movement of said release member relative to said adjusting member, and a return spring for said release member, said release member having a finger piece associated with the grip for simultaneous actuation.

4. Adjusting and locking mechanism adapted to be longitudinally slidably received in a tubular supporting member having internal forwardly facing ratchet teeth in the bottom thereof comprising, an elongated sheet metal adjusting member of U-shaped cross section having a handle on its front end, the flanges of said adjusting member having aligned pivot holes formed therein toward their rear end, a slot formed in one of the flanges of said adjusting member and opening at its forward end to the pivot hole therein, a locking pawl positioned within said adjusting member and slidable through said slot, said pawl having laterally projecting pivot arms on its upper end pivotally received in said holes, a spring engaged between said pawl and said adjusting member and biasing the swinging end of said adjusting member, an elongated flat release member reciprocably mounted in said adjusting member and having a finger piece on its forward end projecting through said handle, the rear end of said release member being slotted and received over said pawl with the lower edge of the slot forming a pawl releasing element, coacting stop portions on said adjusting member and said releasing member limiting longitudinal motion therebetween, and a spring biasing said release member forwardly.

HERMAN WEBER.

REFERENCES CITED

The following references are of record in the file of this patent:

UNITED STATES PATENTS

| Number | Name | Date |
|---|---|---|
| Re. 21,581 | Jandus et al. | Sept. 24, 1940 |
| 1,564,725 | Topham | Dec. 8, 1925 |
| 2,177,456 | Irving | Oct. 24, 1939 |
| 2,294,002 | Saunders | Aug. 25, 1942 |
| 2,453,509 | Sandberg | Feb. 27, 1951 |
| 2,557,365 | Weber | June 19, 1951 |

FOREIGN PATENTS

| Number | Country | Date |
|---|---|---|
| 481,199 | Great Britain | Mar. 8, 1938 |
| 516,309 | Great Britain | Dec. 29, 1939 |